US006586353B1

(12) United States Patent
Kiik et al.

(10) Patent No.: US 6,586,353 B1
(45) Date of Patent: *Jul. 1, 2003

(54) ROOFING UNDERLAYMENT

(75) Inventors: Matti Kiik, Richardson, TX (US); Michael L. Bryson, Blue Springs, MO (US); Robert Joseph Tobin, Double Oak, TX (US); Younger Ahluwalia, Desoto, TX (US)

(73) Assignee: Elk Corp. of Dallas, Dallas, TX (US)

( * ) Notice: Subject to any disclaimer, the term of this patent is extended or adjusted under 35 U.S.C. 154(b) by 135 days.

This patent is subject to a terminal disclaimer.

(21) Appl. No.: 09/663,255

(22) Filed: Sep. 15, 2000

Related U.S. Application Data
(60) Provisional application No. 60/168,057, filed on Nov. 30, 1999.

(51) Int. Cl.[7] .................................................. D04H 1/08
(52) U.S. Cl. ............................ 442/320; 442/64; 442/65; 442/68; 442/136; 442/172; 428/141; 428/489; 428/357; 428/323; 428/105; 428/317.7
(58) Field of Search .......................... 442/320, 64, 65, 442/68, 136, 172; 428/141, 489, 357, 323, 105, 317.7

(56) References Cited

U.S. PATENT DOCUMENTS

| 74,606 A | 2/1868 | Schanck |
|---|---|---|
| 79,645 A | 7/1868 | Ferguson |
| 83,539 A | 10/1868 | Pinner |
| 3,603,221 A | 9/1971 | Barton et al. |
| 3,616,173 A | 10/1971 | Green et al. |
| 3,634,293 A | 1/1972 | Bonitz |
| 3,721,578 A | 3/1973 | Bennett et al. |
| 3,841,885 A | 10/1974 | Jakel |
| 3,954,555 A | 5/1976 | Kole et al. |
| 3,992,340 A | 11/1976 | Bonitz |
| 4,044,188 A | 8/1977 | Segal |
| 4,073,997 A | 2/1978 | Richards et al. |
| 4,079,158 A | 3/1978 | Kennepohl et al. |
| 4,082,885 A | 4/1978 | Rashid et al. |
| 4,130,516 A | 12/1978 | Gagle et al. |
| 4,135,022 A | 1/1979 | Kennepohl et al. |
| 4,186,236 A | 1/1980 | Heitmann |
| 4,212,912 A | 7/1980 | Wartusch et al. |
| 4,212,913 A | 7/1980 | Auten |
| 4,214,032 A | 7/1980 | Csikós et al. |
| 4,229,329 A | 10/1980 | Bennett |
| 4,265,962 A | 5/1981 | May |
| 4,273,685 A | 6/1981 | Marzocchi et al. |
| 4,291,086 A | 9/1981 | Auten |
| 4,306,911 A | 12/1981 | Gordon et al. |
| 4,313,968 A | 2/1982 | Sickles et al. |
| 4,331,726 A | 5/1982 | Cleary |
| 4,332,705 A | 6/1982 | Uffner |
| 4,388,366 A | 6/1983 | Rosato et al. |
| 4,405,680 A | 9/1983 | Hansen |
| 4,460,737 A | 7/1984 | Evans et al. |
| 4,468,430 A | 8/1984 | Ruede |
| 4,472,243 A | 9/1984 | Bondoc et al. |
| 4,473,610 A | 9/1984 | Davis |
| 4,478,610 A | 10/1984 | Parekh et al. |
| 4,506,060 A | 3/1985 | White, Sr. et al. |
| 4,513,045 A | 4/1985 | Bondoc et al. |
| 4,521,478 A | 6/1985 | Hageman |
| 4,555,543 A | 11/1985 | Effenberger et al. |
| 4,559,267 A | 12/1985 | Freshwater et al. |
| 4,560,612 A | 12/1985 | Yau |
| 4,571,356 A | 2/1986 | White, Sr. et al. |
| 4,599,258 A | 7/1986 | Hageman |
| 4,609,709 A | 9/1986 | Yau |
| 4,610,918 A | 9/1986 | Effenberger et al. |
| 4,612,238 A | 9/1986 | DellaVecchia et al. |
| 4,647,496 A | 3/1987 | Lehnert et al. |
| 4,654,235 A | 3/1987 | Effenberger et al. |
| 4,664,707 A | 5/1987 | Wilson et al. |
| 4,683,165 A | 7/1987 | Lindemann et al. |
| 4,738,884 A | 4/1988 | Algrim et al. |
| 4,745,032 A | 5/1988 | Morrison |
| 4,746,560 A | 5/1988 | Goeden |
| 4,755,545 A | 7/1988 | Lalwani |
| 4,764,420 A | 8/1988 | Gluck et al. |

(List continued on next page.)

FOREIGN PATENT DOCUMENTS

| DE | 289082 | 4/1991 |
|---|---|---|
| DE | 19729533 | 1/1999 |
| EP | 764748 | 3/1997 |
| GB | 1228592 | 5/1971 |
| RU | 564374 | 7/1977 |
| WO | PCT/US87/01474 | 1/1988 |
| WO | 9900338 | 1/1999 |

OTHER PUBLICATIONS

Correspondence from Elk Corporation to Fontana Paper Mill dated Jul. 30, 1999 and Aug. 19, 1999, including a copy of the Confidentiality Agreement executed between these two parties covering three samples supplied by Elk to Fontana Paper Mill for confidential evaluation.
Product description for Tough–Guard® Roof Eave and Valley Protector reprinted from the Georgia–Pacific Web site, the URL of which is http://www.gp.com/roofing/pdf/041700.pdf.

Primary Examiner—Elizabeth M. Cole
Assistant Examiner—Norca L. Torres
(74) Attorney, Agent, or Firm—Baker Botts L.L.P.

(57) ABSTRACT

The present invention relates to a roofing underlayment system comprising two layers of a coated structural article which comprises a substrate having an ionic charge coated with a coating having essentially the same ionic charge or one layer of such coated structural article in combination with one layer of felt material. The coating of the coated structural article consists essentially of a filler material and a binder material wherein the binder material bonds the filler material together and to the substrate and wherein the coating does not bleed through the substrate. The roofing underlayment system of the present invention can impart a Class B or better (Class A) fire rating to a roof assembly.

18 Claims, No Drawings

U.S. PATENT DOCUMENTS

| | | |
|---|---|---|
| 4,784,897 A | 11/1988 | Brands et al. |
| 4,810,569 A | 3/1989 | Lehnert et al. |
| 4,835,004 A | 5/1989 | Kawanishi |
| 4,837,095 A | 6/1989 | Hageman |
| 4,879,173 A | 11/1989 | Randall |
| 4,889,880 A | 12/1989 | Miller |
| 4,917,764 A | 4/1990 | Lalwani et al. |
| 4,944,818 A | 7/1990 | Dybsky et al. |
| 5,001,005 A | 3/1991 | Blanpied |
| 5,015,711 A | 5/1991 | Simon et al. |
| 5,019,610 A | 5/1991 | Sitz et al. |
| 5,030,507 A | 7/1991 | Mudge et al. |
| 5,099,627 A | 3/1992 | Coulton et al. |
| 5,110,839 A | 5/1992 | Chao |
| 5,112,678 A | 5/1992 | Gay et al. |
| 5,148,645 A | 9/1992 | Lehnert et al. |
| 5,192,366 A | 3/1993 | Nishioka et al. |
| 5,220,762 A | 6/1993 | Lehnert et al. |
| 5,232,530 A | 8/1993 | Malmquist et al. |
| 5,318,844 A | 6/1994 | Brandon |
| 5,334,648 A | 8/1994 | Drews et al. |
| 5,342,680 A | 8/1994 | Randall |
| 5,347,785 A | 9/1994 | Terrenzio et al. |
| 5,369,929 A | 12/1994 | Weaver et al. |
| 5,371,989 A | 12/1994 | Lehnert et al. |
| 5,391,417 A | 2/1995 | Pike |
| 5,393,794 A | 2/1995 | Sperber |
| 5,397,631 A | 3/1995 | Green et al. |
| 5,401,588 A | 3/1995 | Garvey et al. |
| 5,437,717 A | 8/1995 | Doyle et al. |
| 5,437,923 A | 8/1995 | Kalkanoglu |
| 5,445,878 A | 8/1995 | Mirous |
| 5,476,542 A | 12/1995 | Doyle et al. |
| 5,496,400 A | 3/1996 | Doyle et al. |
| 5,501,730 A | 3/1996 | Duong et al. |
| 5,518,586 A | 5/1996 | Mirous |
| 5,573,586 A | 11/1996 | Yap et al. |
| 5,580,376 A | 12/1996 | Hayner |
| 5,580,378 A | 12/1996 | Shulman |
| 5,601,680 A | 2/1997 | Kuszaj et al. |
| 5,601,888 A | 2/1997 | Fowler |
| 5,604,274 A | 2/1997 | Gallagher et al. |
| 5,665,442 A | 9/1997 | Andersen et al. |
| 5,687,517 A | 11/1997 | Wiercinski et al. |
| 5,698,304 A | 12/1997 | Brandon et al. |
| 5,717,012 A | 2/1998 | Bondoc et al. |
| 5,718,785 A | 2/1998 | Randall |
| 5,776,841 A | 7/1998 | Bondoc et al. |
| 5,795,380 A | 8/1998 | Billings et al. |
| 5,884,446 A | 3/1999 | Hageman |
| 5,965,257 A | 10/1999 | Ahluwalia |

ROOFING UNDERLAYMENT

The applicants claim the benefits under Title 35 U.S.C. §119(e) of prior U.S. Provisional Application Serial No. 60/168,057 which was filed on Nov. 30, 1999.

FIELD OF THE INVENTION

This invention relates to a roofing underlayment system useful in roof assemblies comprising at least two layers of a coated structural article which comprises a substrate having an ionic charge coated with a coating having essentially the same ionic charge, or at least one layer of such coated structural article in combination with at least one layer of felt material. The underlayment of the present invention allows roof assemblies to achieve a class B or better (Class A) rating for protection against moderate to severe exposure to fire.

BACKGROUND OF THE INVENTION

Roofing underlayment is applied to the deck of a roof before the application of roofing shingles or other roofing material primarily to shield the roof deck from moisture, both during assembly and after roof installation. Underlayment also helps reduce "picture framing" in which the outline of deck panels caused by irregularities in the deck surface may be visible through the roofing material applied to the roof deck. Further, the roofing underlayment should be a key component of a fire rated roof assembly. The underlayment structure should assist in preventing flaming of the underside of the deck when exposed to fire on top of the roof covering assembly. Thus, the benefits of the underlayment in the roof assembly are to provide additional fire resistance and water resistance, and to provide uniformity of the appearance of the roof surface.

Conventional roofing underlayment typically comprises a dry cellulosic felt that can be impregnated or saturated with an organic material such as asphalt. When used as an underlayment, felt typically does not provide a completely flat surface, but has undulations and distortions. It may also distort under high moisture conditions. Saturated organic felt underlayment has poor fire resistance and when burned, disintegrates.

There has long been a need for roofing underlayment that will protect a roof deck from flaming, even when noncombustible roofing materials are employed as the visible roof covering. For instance, metal roofing materials, either standing seam or shingles, are typically considered noncombustible materials. However, for noncombustible metal roof coverings to achieve a Class A fire resistance rating, a ½ inch layer of gypsum board or a layer of ¼ inch Dens-Deck board is usually required on top of the roof deck beneath the saturated felt underlayment that is under the metal roof covering. That is because the heat of a fire burning on top of roofing materials, including noncombustible metal roof coverings, passes through the material to the underlayment which is then susceptible to burning and disintegration. Thus, it has heretofore been deemed necessary to place gypsum board or Dens-Deck board on a roof deck beneath felt underlayment and noncombustible metal roofing materials, even though such boards raise the cost of the roofing materials and their application, and despite the facts that they are heavy, difficult to handle, require covering to protect from rain, and are slippery on steep slopes; because otherwise, a Class A fire resistance rating cannot be achieved.

Thus, there is a need for a roofing underlayment system which provides fire resistance (preferably Class B or better), water resistance, and uniformity of the appearance of the roof surface, but which is not heavy, difficult to handle, slippery nor overly costly.

SUMMARY OF THE INVENTION

The present invention provides an improved roofing underlayment system comprising at least two layers of a coated structural article which comprises a substrate having an ionic charge coated with a coating having essentially the same ionic charge, or at least one layer of such coated structural article in combination with at least one layer of felt material. The felt material may be comprised of cellulosic fibers, glass fibers or mixtures thereof. In addition, the felt material may be saturated with an organic material, such as asphalt. The coating of the coated structural article consists essentially of a filler material and a binder material wherein the binder material bonds the filler material together and to the substrate and wherein the coating does not bleed through the substrate.

The roofing underlayment system of the present invention allows roof assemblies to achieve a Class B or better (Class A) rating for protection against moderate to severe exposure to fire without the use of intermediate barriers such as gypsum or other noncombustible decking. In addition, the roofing underlayment system of the present invention is not difficult to handle since it is lighter in weight than other roofing underlayment systems, is not slippery on steep slopes and is not as costly as other roofing underlayment systems comprising intermediate barriers.

The roofing underlayment system of the present invention may be used with a variety of roof assemblies including, but not limited to, combustible products and noncombustible products that do not meet a Class B or better fire resistance rating. Nonlimiting examples of such roof assemblies include, Class C asphalt shingles, plastic molded or extruded shingles, non-asphalt composite shingles, rubber based shingles, steel shingles, steel standing seam roofing systems, steel corrugated panel roofing systems, aluminum standing steam roofing systems, aluminum shingles, clay tiles, light weight concrete roofing shingles and cement tiles.

DETAILED DESCRIPTION

The applicants have discovered that an improved roofing underlayment system can be made by combining at least two layers of a coated structural article which comprises a substrate having an ionic charge coated with a coating having essentially the same ionic charge, or at least one layer of such coated structural article with at least one layer of a felt material.

Examples of suitable felt material include cellulosic fibers, glass fibers and mixtures thereof. The felt material may be saturated with an organic material, such as asphalt. Examples of such materials are disclosed in U.S. Pat. Nos. 4,513,045, and 5,717,012. The texts of both of these patents are incorporated herein by reference.

The coating of the structural article consists essentially of a filler material and a binder material. For example, U.S. Pat. No. 5,965,257, the text of which is incorporated herein by reference, teaches that by coating the substrate with a coating having essentially the same ionic charge, a zero bleed through product is made while using only two major ingredients in the coating. By producing a coating having essentially the same ionic charge as the substrate, a zero bleed through product may be produced having a low binder content and no viscosity modifiers.

The substrate of the structural article may be any suitable reinforcement material capable of withstanding high temperatures such as glass fibers, polyester fibers, cellulosic fibers, asbestos, steel fibers, alumina fibers, ceramic fibers, nylon fibers, graphite fibers, wool fibers, boron fibers, carbon fibers, jute fibers, polyolefin fibers, polystyrene fibers, acrylic fibers, phenol-formaldehyde resin fibers, aromatic and aliphatic polyamide fibers, polyacrylamide fibers, or mixtures thereof which may include bi-component fibers or multi-component fibers.

In a preferred embodiment, the filler employed in the coating of the structural article may be class F fly ash, class C fly ash or mixtures thereof. Preferably, the filler is class F fly ash wherein 90% to 95% by weight of the fly ash is aluminosilicate. Such a fly ash, known as Alsil O4TR, is produced by JTM Industries, of Kennesaw, Ga. In an alternative embodiment, the filler may be charged calcium carbonate or ceramic microspheres, or a blend of fly ash and calcium carbonate, or a blend of fly ash, calcium carbonate and ceramic microspheres.

The table below provides, in percentages, some of the combinations of calcium carbonate, fly ash and ceramic microspheres which may be utilized as the filler component in the coating:

TABLE I

| | A % | B % | C % | D % | E % | F % |
|---|---|---|---|---|---|---|
| 1. Water | 18.9 | 25.9 | 37.33 | 25.9 | 24.9 | 24.9 |
| 2. Acrylic Latex | 6.0 | 6.0 | 6.42 | 6.0 | 6.0 | 6.0 |
| 3. Fly Ash | 75.0 | 34.0 | — | 40.0 | — | 20.0 |
| 4. CaCO$_3$ | — | 34.0 | — | — | 40.0 | 20.0 |
| 5. Microspheres | — | — | 56.14 | 28.0 | 29.0 | 29.0 |
| 6. Defoamer | 0.1 | 0.1 | 0.1 | 0.1 | 0.1 | 0.1 |
| | 100% | 100% | 100% | 100% | 100% | 100% |

The microspheres may be a 50/50 ratio of 3M's W1012 microspheres and 3M's smaller diameter G200 microspheres. Although the table shows possible combinations of calcium carbonate, fly ash and ceramic microspheres in the filler component of the coating, it is believed that any combination of these materials may be employed.

In one embodiment, the coating is prepared by using a binder material such as a high performance heat-reactive acrylic latex polymer to bond the filler materials together and to bond the filler to the substrate. Such a binder material is Hycar 2679 acrylic latex polymer supplied by B.F. Goodrich Company of Cleveland, Ohio. It is believed, however, that any linear polymer, linear copolymer or branched polymer may be useful in preparing the coating. Possible binder materials include butyl rubber latex, SBR latex, neoprene latex, polyvinyl alcohol emulsion, SBS latex, water based polyurethane emulsions and elastomers, vinyl chloride copolymers, nitrile rubbers and polyvinyl acetate copolymers.

In a preferred embodiment, the coating may comprise nearly 85% by weight of the structural article. In that coating, approximately from 84% to 96% by weight may be filler and the remainder may be the acrylic latex binder. The filler may be approximately 50% fly ash and 50% calcium carbonate. The substrate may comprise about 15% by weight of the structural article. Glass fibers may comprise approximately 12% by weight of the article and a binder material may comprise about 3% by weight of the article. The binder which bonds together the glass fibers may be from 99% to 75% (preferably 98% to 94%) by weight urea formaldehyde and from 1% to 25% (preferably 2% to 6%) by weight standard acrylic latex.

The substrate may be coated in a variety of ways. For example, the substrate may be coated by air spraying, dip coating, knife coating, roll coating or film application such as lamination/heat pressing. The coating may be bonded to the substrate by chemical bonding, mechanical bonding and/or thermal bonding. Mechanical bonding may be achieved by force feeding the coating onto the substrate with a knife.

Structural articles made in accordance with this invention may be of any shape but preferably, such articles are planar in shape. The substrate is coated on one side or both sides depending on the intended application.

Additionally, the structural article may be coated with a water repellent material. Two such water repellent materials are Aurapel330R and Aurapel 391 available from the Auralux Corporation of Norwich, Conn. It is believed that wax emulsions, oil emulsions, silicone emulsions, polyolefin emulsions and surfonyls as well as other similar performing products may also be suitable water repellent materials. Further, structural articles made in accordance with the invention may be coated with an algaecide such as zinc powder, copper oxide powder or the herbicides Atrazine available from e.g. Ribelin Industries or Diuron available from e.g. Olin Corporation, an antifungal material such as Micro-Chek 11P, an antibacterial material such as Micro-Chek 11-S-160, a surface friction agent such as Byk-375, a flame retardant material such as ATH (aluminum trihydrate) available from e.g. AkzoChemicals and antimony oxide available from e.g. Laurel Industries and/or a coloring dye such as T-1133A and iron oxide red pigments, and other products which can impart specific surface functions. The Micro-Chek products are available from the FerroCorporation of Walton Hills, Ohio. Byk-375 may be obtained from Wacker Silicone Corporation of Adrian, Mich. and T-1133A is sold by Abco Enterprises Inc. of Allegan, Mich. The additional coatings of, e.g. water repellent material, antifungal material, antibacterial material, etc., may be applied to one or both sides of structural articles otherwise having filler/binder coatings on one or both sides of a substrate. For example, structural articles comprising substrates coated on one or both sides with filler/binder coatings could be coated on one side with a water repellent composition and on the other side with an antibacterial agent.

The substrate in the coating may be a nonwoven fiberglass mat which is desirable because it is light in weight. Fiberglass mats are also preferred as substrates because of their fire resistant nature, their resistance to moisture damage, their excellent dimensional stability, their resistance to curl with temperature changes, their resistance to rot and decay, and their ability to accept organic coatings.

As noted above, the felt material may be comprised of celluosic fibers, glass fibers or mixtures thereof, and may be asphalt saturated. In addition, other polyester or polypropylene reinforced matrixes utilized as roofing underlayments may be used. Examples of some of the various types of materials that could be used are disclosed in U.S. Pat. Nos. 4,513,045 and 5,717,012, the entire disclosures of which are incorporated herein by reference.

The applicants' invention allows roof assemblies to achieve a Class B or better (Class A) rating for protection against moderate to severe exposure to fire. This is because in the applicants' underlayment system, the coated structural article is comprised mainly of nonflammable filler coating. Additionally, the mat which is coated by that filled coating is also nonflammable. Thus, the present invention provides a novel roofing underlayment system which is comprised of at least two layers of a coated structural article or at least one layer of such structural article combined with at least one layer of a felt material. The invention allows roofing assemblies to achieve Class A or B fire ratings without the use of intermediate barriers such as gypsum or other noncombustible decking.

In accordance with the invention, a roofing underlayment system is installed by combining at least two layers of the coated structural article or a first layer of a coated structural article adjacent to a second layer of a felt material. In a preferred embodiment, the coated structural article may be a coated fiberglass substrate made according to U.S. Pat. No. 5,965,257. In application to the roof deck, the composite underlayment may be applied with either component adjacent to the deck. Some unique, ornamental, highly combustible roofing products may require multiple layers of the coated structural article together with one layer of a felt material to achieve a Class A or B fire resistance rating.

The composite underlayment system of the present invention may be used with a variety of roof assemblies including, but not limited to, combustible products and noncombustible products that do not themselves meet a Class A or B fire resistance rating. Nonlimiting examples of combustible products which may be used with the composite underlayment system of the present invention include Class C asphalt shingles, plastic molded or extruded shingles, non-asphalt composite shingles and rubber based shingles. Nonlimiting examples of noncombustible products which may be used with the composite underlayment system of the present invention include steel shingles, steel standing seam roofing systems, steel corrugated panel roofing systems, aluminum standing seam roofing systems, aluminum shingles, clay tiles, light weight concrete roofing shingles and cement tiles.

The invention is further illustrated by reference to the following examples.

EXAMPLES

Burning Brand Tests

Class A burning brand tests were conducted at U.L. Laboratories with 30 gauge galvanized steel panels on 15/32 inch thick plywood decks. The following three configurations were tested: (1) two layers of VersaShield™ coated structural articles made in accordance with U.S. Pat. No. 5,965,257 and available from Elk Corporation in Ennis, Tex. were put between the deck and a steel panel; (2) one layer of VersaShield™ was put under one layer of D226 type II-felt underlayment available from Tamko Roofing Products in Jopplin, Mo. with a steel panel on top; and (3) one layer of VersaShield™ was put on top of one layer of D226 type II-felt underlayment with a steel panel on top. All three configurations passed the Class A burning brand tests. The preferred embodiment was one layer of VersaShield™ coated structural article combined with one layer of 30 lb. D226 type II-felt underlayment.

When a roofing underlayment comprising just one layer of the VersaShield™ coated structural article was tested between a deck and a steel panel, the configuration did not pass the Class A burning brand test. Similarly, when a roofing underlayment comprising just one layer of organic felt underlayment was placed between the deck and a steel panel, the configuration did not pass the Class A burning brand test.

It should be understood that the above examples are illustrative, and that compositions other than those described above can be used while utilizing the principals underlying the present invention. For example, other sources of inert materials as well as mixtures of binders and/or additives can be used in formulating the structural articles. Other suitable types of conventional underlayment can be used in combination with the coated structural article to improve the properties of the underlayment system formed therefrom.

What is claimed is:

1. A roofing underlayment system comprising at least one layer of felt material and at least one layer of a coated structural article, said structural article comprising a substrate having an ionic charge coated with a coating having essentially the same ionic charge wherein said coating consists essentially of a filler material and a binder material and wherein said binder material bonds the filler material together and to the substrate and wherein said coating does not bleed through said substrate.

2. The roofing underlayment system according to claim 1 wherein the felt material is selected from the group consisting of cellulosic fibers, glass fibers and mixtures thereof.

3. A roofing underlayment system comprising at least two layers of a coated structural article, said structural article comprising a substrate having an ionic charge coated with a coating having essentially the same ionic charge wherein said coating consists essentially of a filler material and a binder material and wherein said binder material bonds the filler material together and to the substrate and wherein said coating does not bleed through said substrate.

4. A roofing underlayment system according to claims 1 or 3 wherein said substrate is fiberglass, said filler is selected from the group consisting of fly ash, calcium carbonate, ceramic microspheres and mixtures thereof and said binder is acrylic latex.

5. A roofing underlayment system according to claim 4 wherein said substrate is planar and is coated on one side with said coating.

6. A roofing underlayment system according to claim 4 wherein said substrate is planar and is coated on both sides with said coating.

7. A roofing underlayment system according to claims 1 or 3 wherein said article further includes a water repellent material.

8. A roofing underlayment system according to claims 1 or 3 wherein said article further includes an antifungal material.

9. A roofing underlayment system according to claims 1 or 3 wherein said article further includes an antibacterial material.

10. A roofing underlayment system according to claims 1 or 3 wherein said article further includes a surface friction agent.

11. A roofing underlayment system according to claims 1 or 3 wherein said article further includes a flame retardant material.

12. A roofing underlayment system according to claims 1 or 3 wherein said article further includes an algaecide.

13. A roofing underlayment system according to claims 1 or 3 wherein said article is colored with dye.

14. A roofing underlayment system according to claims 1 or 3 wherein said substrate is bonded together by a binder material consisting essentially of urea formaldehyde and acrylic latex.

15. A roofing underlayment system according to claim 1 or 3 wherein the structural article is coated with a coating consisting essentially of a filler material and a binder material wherein
   a) said article is from 10% to 25% by weight glass fibers and
   b) said coating is from 84% to 96% filler selected from the group consisting of fly ash, charged calcium carbonate, ceramic microspheres and mixtures thereof and from 16% to 4% acrylic latex binder material.

16. A roofing underlayment system according to claim 15 wherein said coating further includes SBR rubber.

17. A roofing underlayment system according to claim 16 wherein said acrylic latex binder and said rubber are cross linked.

18. A roofing underlayment system according to claim 17 wherein said glass fibers are bonded together by a mixture of from 99% to 75% urea formaldehyde and from 1% to 25% acrylic latex.

* * * * *

UNITED STATES PATENT AND TRADEMARK OFFICE
CERTIFICATE OF CORRECTION

PATENT NO. : 6,586,353 B1
DATED : July 1, 2003
INVENTOR(S) : Kiik et al.

It is certified that error appears in the above-identified patent and that said Letters Patent is hereby corrected as shown below:

Column 2,
Line 39, "steam" should read -- seam --

Column 4,
Line 17, "Aurapel330R" should read -- Aurapel 330R --
Line 20, "surfonyls" should read -- sulfonyls --
Line 36, "FerroCorpora-" should read -- Ferro Corpora- --
Line 57, "celluosic" should read -- cellulosic --

Column 6,
Line 52, "Jopplin, Mo." should read -- Joplin, Mo. --

Signed and Sealed this

Seventh Day of October, 2003

JAMES E. ROGAN
*Director of the United States Patent and Trademark Office*